July 16, 1935.     S. MEISNER     2,008,331

PIE EDGE TRIMMER

Filed April 26, 1935

Inventor
Saul Meisner
By J. M. Bryant, Attorney

Patented July 16, 1935

2,008,331

UNITED STATES PATENT OFFICE 2,008,331

PIE EDGE TRIMMER

Saul Meisner, Columbus, Ohio

Application April 26, 1935, Serial No. 18,460

6 Claims. (Cl. 107—49)

This invention relates to certain new and useful improvements in pie edge trimmers.

The primary object of the invention is to provide a pie edge trimmer designed for trimming or removing the excess dough at the marginal edge of a pie pan.

A further object of the invention is to provide a pie edge trimmer of the foregoing character embodying a holder for an elastic ring member confined therein with the foot portion of the ring member projecting below the holder to provide a cushion support for the latter, while the upper end of the ring member tapers to a relatively sharp edge of circular formation adapted to be passed over a pie pan mounted on an elevated support with the upper tapered edge of the elastic ring member cutting or removing the edges of the lower and upper pie crust that usually overhang or project beyond the upper marginal edge of the pie pan.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1:
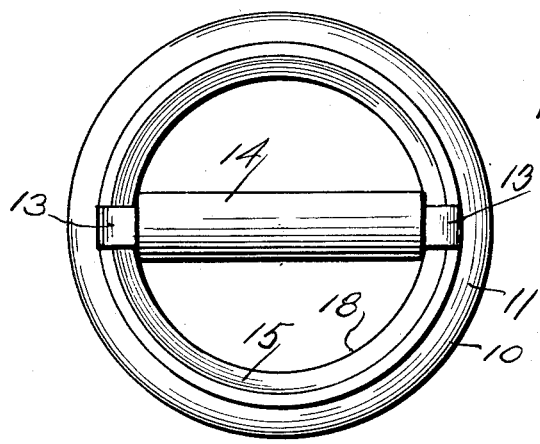
Figure 1 is a top plan view of a pie edge trimmer constructed in accordance with the present invention.
Figure 2:
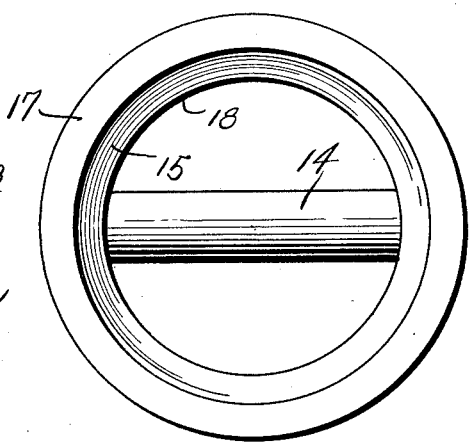
Figure 2 is a bottom plan view of the device.
Figure 3:
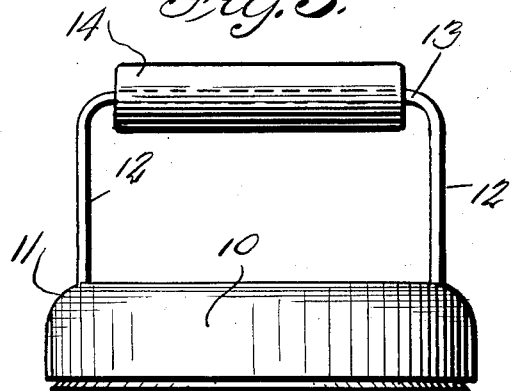
Figure 3 is a side elevational view showing the upstanding handle and the elastic ring member of the trimmer projecting below the holder or body portion thereof.
Figure 4:
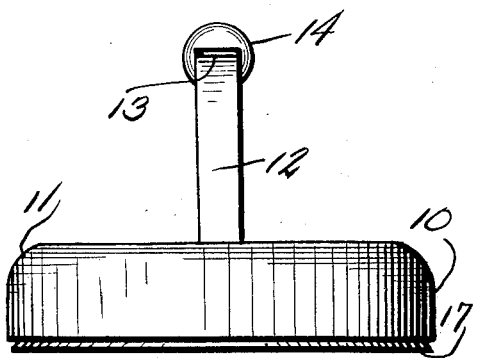
Figure 4 is another side elevational view of the pie edge trimmer.

Referring more in detail to the accompanying drawing, the pie edge trimmer comprises an annular wall 10 open at the top and bottom and curved in cross-section as at 11 in an inward and upward direction and carrying a handle frame at its upper side of inverted U-shape with side legs 12, an upper connecting rod 13 with a handle grip 14 on the connecting rod.

An elastic ring member 15 of cushion rubber or similar material is confined within the annular wall 10 and extends over the curved portion 11 of said wall, the same being retained in position by the metallic ring or band 16 engaged with the inner face of the elastic ring member 15. As shown more clearly in Figures 5 and 6, the lower edge of the elastic ring member 15 flares inwardly and outwardly below the annular wall 10 and band 16 to provide a cushion foot 17 for the support of the device when out of use. The upper end of the elastic ring member 15 follows the curved section 11 of the annular wall 10 and tapers to a comparatively sharp or thin edge 18 disposed inwardly of and concentric with the upper end of the annular wall 10.

Figure 5:
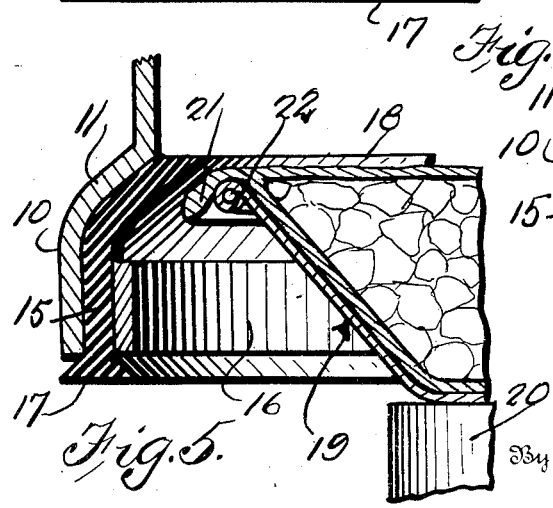
Figure 5 is a fragmentary vertical cross-sectional view showing a pie pan mounted upon an elevated support with the trimmer in position for severing or removing the overhanging edge of the pie crust or dough layers.
Figure 6:
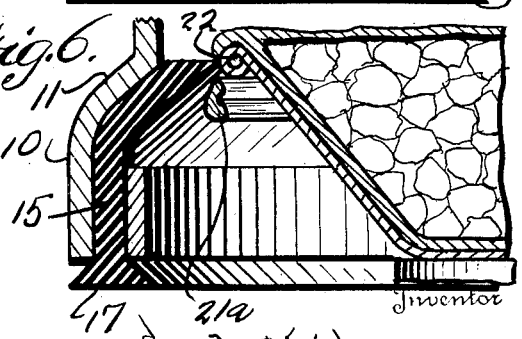
Figure 6 is a fragmentary sectional view, similar to Figure 5, showing the trimmer in lowered position with the excess dough removed from the marginal edge of the pie pan.

The use of the pie trimmer is illustrated in Figures 5 and 6. As shown in Figure 5, the pie pan 19 is mounted upon an elevated support 20 with the marginal edges of the pie pan liner or bottom dough layer and upper dough layer projecting over or beyond the upper marginal edge 22 of the pie pan 19. The pie edge trimmer is then gripped by the handle 14 and placed over the pie pan as shown in Figure 5 and then lowered relative to the pie pan as shown in Figure 6 with the sharp or thin edge 18 of the elastic ring member 15 engaged with the projecting edges 21 of the dough layers for trimming the same at the marginal edge 22 of the pie pan and removing the excess dough as shown at 21a in Figure 6.

While there is herein shown and described the preferred embodiment of the present invention, it is nevertheless to be understood that minor changes may be made therein without departing from the spirit and scope of the invention as claimed.

I claim:—

1. In a pie edge trimmer of the character described, an annular wall, an elastic ring member confined within the annular wall with the upper annular edge thereof tapered and projecting inwardly of the annular wall and said tapered edge adapted to be moved in enclosing and engaging relation to the marginal edge of a pie pan for removal of excess dough at the marginal edge of a pan.

2. In a pie edge trimmer of the character described, an annular wall, an elastic ring member confined within the annular wall with the upper annular edge thereof tapered and projecting inwardly of the annular wall and said tapered edge adapted to be moved in enclosing and engaging relation to the marginal edge of a pie pan for removal of excess dough at the marginal edge of a pan, the lower edge of the elastic ring member extending below the annular wall to provide a foot.

3. In a pie edge trimmer of the character described, an annular wall, an elastic ring member confined within the annular wall with the upper annular edge thereof tapered and projecting inwardly of the annular wall and said tapered edge adapted to be moved in enclosing and engaging relation to the marginal edge of a pie pan for removal of excess dough at the marginal edge of a pan, the lower edge of the elastic ring extending below the annular wall and flanged inwardly and outwardly to provide a relatively wide foot support.

4. A pie edge trimmer as set forth in claim 1, characterized by an annular band engaged with the inner face of the elastic ring member to retain the same engaged with the annular wall.

5. A pie edge trimmer as set forth in claim 2, characterized by an annular band engaged with the inner face of the elastic ring member to retain the same engaged with the annular wall.

6. A pie edge trimmer as set forth in claim 4, characterized by an annular band engaged with the inner face of the elastic ring member to retain the same engaged with the annular wall.

SAUL MEISNER.